United States Patent Office 2,923,517
Patented Feb. 2, 1960

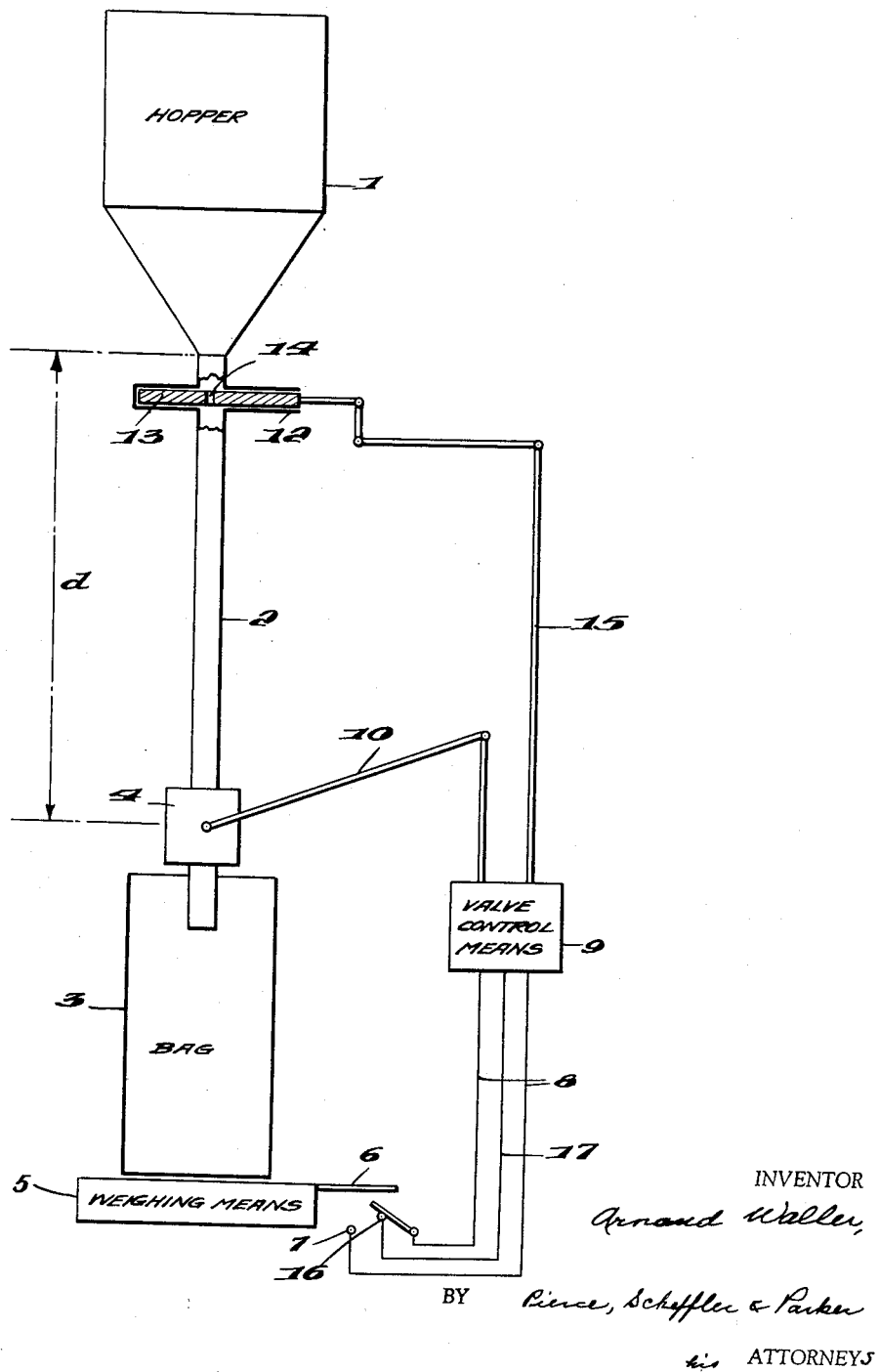

2,923,517
WEIGHING APPLIANCE

Arnoud Waller, Vlaardingen, Netherlands, assignor to Albatros Superfosfaatfabrieken N.V., Utrecht, Netherlands, a Dutch limited-liability company of the Netherlands Application October 25, 1956, Serial No. 618,337

Claims priority, application Netherlands October 25, 1955

3 Claims. (Cl. 249—1)

The invention relates to a weighing appliance for automatically weighing out given quantities of bulk goods, e.g. for bagging them, the appliance being equipped with a weighing mechanism comprising a bin, bag or other collecting device for the bulk goods, to which the bulk goods can be fed in a freely falling stream, and a valve or the like, controlled by the weighing mechanism, for interrupting the stream of bulk goods. This valve is controlled, for example, by electrical means, for which purpose the weighing mechanism may comprise a contact which is closed when the position of equilibrium is reached. In such a weighing appliance the bulk goods are usually first fed in a big stream until about 90 percent of the quantity to be weighed out has been reached, and subsequently in a small stream until the position of equilibrium has been attained, at which moment the stream of bulk goods is interrupted by the valve.

There are several causes which may give rise to weighing errors in such weighing appliances. In the first place the closure of the valve requires some time when the signal for it is given by the weighing mechanism. During this interval a certain quantity of bulk goods will continue to flow through the valve. Secondly, the weighing mechanism requires a certain adjusting time to adopt the position corresponding to the quantity fed. The closing signal for the valve therefore is not given as soon a the quantity of bulk goods corresponding to the position of equilibrium has reached the collecting device, but so much later as the adjusting time amounts to, so that during this time an excess of bulk goods is fed. Thirdly, at the moment of closure of the valve a certain quantity of bulk goods is on its way between said valve and the collecting device, which quantity will therefore reach the collecting device after the closure of the valve. Fourthly, weighing errors may be caused by the force exercised on the collecting device by the stream of bulk goods impinging on this collecting device with some velocity.

The weighing errors brought about by the third and the fourth cause in the known weighing appliances are of the same order of magnitude, but of opposite signs, so that they virtually neutralize each other. The remaining weighing errors are compensated in practice by means of an auxiliary weight. The magnitude of these errors, however, depends on the size and rate of flow of the stream of bulk goods, which parameters in turn depend at least in part on the character, e.g. the stickiness, of the bulk goods, so that the auxiliary weight has to be readjusted whenever the character of the bulk goods changes. Especially when the character of the bulk goods changes gradually, e.g. owing to small variations in the circumstances in which they are produced, frequent re-adjustment of the auxiliary weight will be necessary. This can only be checked by means of repeated test weighings.

The invention makes it possible to eliminate all the above mentioned weighing errors without the use of an adjustable auxiliary weight. To achieve this, according to the invention the weighing appliance is constructed in such a way that at the level of the valve the bulk goods have a given vertical velocity component $v_0$, which has been chosen so as to satisfy the expression $$\frac{v_0}{g} = t_1 + t_2$$

in which $g$ stands for the acceleration of gravity, $t_1$ for the equivalent closing time of the valve, and $t_2$ for the adjusting time of the weighing mechanism. The equivalent closing time $t_1$ of the valve is defined as the time during which a valve adapted to be closed at infinite velocity would have to remain open to allow the passage of the same quantity of bulk goods as the real valve lets through between the beginning and the end of its closing movement. The adjusting time $t_2$ of the weighing mechanism naturally depends on the mechanism's own oscillation period $\tau$ and on its damping. With critical damping, $$t_2 = \frac{\tau}{\pi}$$

The following illustrative calculation gives in mathematical terms the weighing errors brought about by the above-stated four causes of error, and proves that the sum of these errors will be zero when the stream of bulk goods has assumed, at the level of said valve means, a vertical velocity component equal to the acceleration of gravity multiplied by the sum of the adjusting time and the equivalent closure time. In the calculation the indicia used therein have the following meanings:

$t_1$ = equivalent closing time
$t_2$ = adjusting time
$v$ = velocity of fall
$v_0$ = velocity at the level of valve 4
$d$ = density of bulk goods
$a$ = area of valve opening
$g$ = acceleration of gravity first error:

$$t_1 v_0 (d)(a) \qquad (1)$$

second error:

$$t_2 v_0 (d)(a) \qquad (2)$$

third error due to material in transit:

$$v_0(d)(a)(v/g - v_0/g) \qquad (3)$$

fourth error due to impact force:

$$-v_0(d)(a)v/g \qquad (4)$$

the total amount of errors = 1+2+3+4

$$= v_0(d)(a)(t_1 + t_2 + v/g - v_0/g - v/g)$$
$$= v_0(d)(a)(t_1 + t_2 - v_0/g)$$

If sum of errors is to be zero:

$$t_1 + t_2 - v_0/g = 0$$
$$v_0 = g(t_1 + t_2)$$

When the above mentioned expression has been satisfied, the result of the weighing is independent of the size and rate of flow of the stream of bulk goods and of their character, at least if the velocity of the bulk goods at the end of their falling motion is not too great, since otherwise the resistance of the air will begin to form a disturbing factor. The weighing appliance is therefore preferably so constructed that moreover the vertical velocity component $v$ of the bulk goods at the normal level of the bulk goods in the collecting device at the end of each weighing is at most about 3 m./sec. In this case the result aimed at is attained both with powdered and with granular bulk goods. For granular bulk goods $v$ may safely be greater than 3 m./sec.

A normal value for $t_1$ is, for example, 0.1 second. It is advisable to give $t_2$ also a small value, e.g. also 0.1 second, so as to be able to keep $v_0$, and consequently also $v$, at a low value.

For any value of $t_1+t_2$ therefore the value of $v_0$ can be calculated according to the above expression. It is immaterial for the invention how the vertical velocity component $v_0$ is given to the bulk goods at the level of the valve. This can, for example, be done by feeding the bulk goods via a vibrating chute or a hopper discharging at some distance above the valve, this distance being so chosen that the bulk goods have attained a vertical falling velocity $v_0$ when they have reached the level of the valve. Other methods, however, are also conceivable.

It will be obvious that the weighing appliance according to the invention can also be used for automatically weighing out given quantities of liquid. The term "bulk goods" in the specification and claims is therefore to be understood to include liquids.

The accompanying drawing is a schematic representation of apparatus for use in carrying out the present invention. In the drawing, a supply of fluent material to be weighed out is contained in hopper 1, which latter communicates, by way of a generally vertical conduit 2, with a bag 3 into which the material is to be delivered. Interposed in and adjacent the lower end of conduit 2 is a valve mechanism 4. Bag 3 is supported on weighing means 5 which latter may be, for instance, a platform scale (as shown). Weighing means 5 is provided with a switch-closing member 6, which latter moves downwardly with the weighing means as material is introduced into the bag 3. Member 6 is disposed in operative relation to electric switch means 7, connected by electrical conductors 8, 8 to a valve control means 9 provided with valve operating member 10 in operative association with valve mechanism 4, for closing switch 7 at a predetermined level in the descent of member 6 and hence for closing valve mechanism 4. The height of conduit 2 above valve mechanism 4, indicated at "$d$" in the drawing, is sufficiently great that material falling through conduit 2, from hopper 1, attains a vertical falling velocity $v_0$ by the time it reaches the level of said valve mechanism.

Preferably, a second or preliminary valve mechanism 12 may be interposed in conduit 2 between hopper 1 and valve mechanism 4. The preliminary valve mechanism 12 includes a slide valve member 13 in which a relatively (very) small opening 14 is provided, this latter being so located that when the slide valve member is in "closed" position a tiny stream of the bulk goods can pass through said opening. Slide valve member 13 is operatively connected through linkage member 15 to valve control means 9. For actuating the slide valve member there are provided a yieldable contact point 16 in the path of the switch contact arm which contact point 16 is electrically connected to valve control means 9 by conductor 17.

What I claim is:

1. A weighing appliance for automatically weighing out given quantities of bulk goods, which comprises in combination a weighing mechanism having a certain adjusting time, supply means disposed above and at a distance from the weighing mechanism, a generally vertical feed conduit depending from and in operative association with said supply means and adapted to feed bulk goods in a freely falling stream from said supply means to a collecting device disposed on said weighing mechanism, valve means in said feed conduit adjacent the end thereof which is remote from said supply means, said valve means being controlled by said weighing mechanism for interrupting such stream of bulk goods in said feed conduit when equilibrium is reached, said valve means having a certain equivalent closure time, the portion of said feed conduit above said valve means being dimensioned to cause such stream of bulk goods to assume at the level of said valve means a vertical velocity component equal to the acceleration of gravity multiplied by the sum of said adjusting time and said equivalent closure time.

2. A weighing appliance for automatically weighing out given quantities of bulk goods, which comprises in combination a weighing mechanism having a certain adjusting time, a hopper disposed above and at a distance from the weighing mechanism, generally vertical feed conduit depending from and in operative association with said hopper and adapted to feed bulk goods in a freely falling streams from said hopper to a collecting device disposed on said weighing mechanism, valve means in said feed means adjacent the end thereof which is remote from said hopper, said valve means being controlled by said weighing mechanism for interrupting such stream of bulk goods in said feed conduit when equilibrium is reached, said valve means having a certain equivalent closure time, the portion of said feed conduit above said valve means being dimensioned to cause such stream of bulk goods to assume at the level of said valve means a vertical velocity component equal to the acceleration of gravity multiplied by the sum of said adjusting time and said equivalent closure time.

3. A weighing appliance as defined in claim 2, wherein said vertical velocity component is smaller than 3 meters per second and the height of said valve means above the normal level of the bulk goods in the collecting device at the time when equilibrium is reached is less than 0.5 meter.

References Cited in the file of this patent

UNITED STATES PATENTS

| | | |
|---|---|---|
| 766,004 | Thomas | July 26, 1904 |
| 809,026 | Snypp | Jan. 2, 1906 |
| 1,889,663 | Ilyus | Nov. 29, 1932 |
| 2,178,765 | Thorsson | Nov. 7, 1939 |